Figure 1:
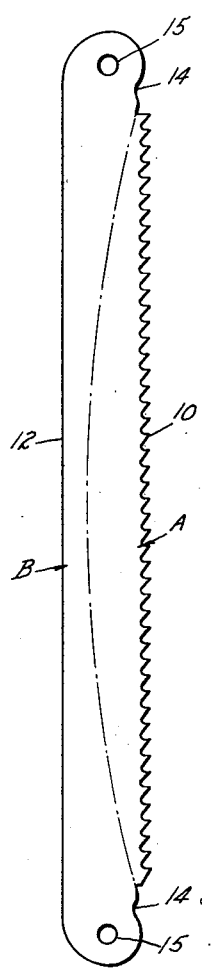

July 16, 1957  W. J. CRAVEN  2,799,078
SAW BLADE
Filed June 28, 1954

INVENTOR.
WILBUR J. CRAVEN
BY
                ATTORNEYS.
Lindsey and Pritzman

United States Patent Office 2,799,078
Patented July 16, 1957

2,799,078

SAW BLADE

Wilbur J. Craven, East Hartford, Conn., assignor to The Capewell Manufacturing Company, Hartford, Conn., a corporation of Connecticut Application June 28, 1954, Serial No. 439,553

7 Claims. (Cl. 29—95)

The present invention relates to metal cutting blades and is particularly concerned with hacksaw blades or power blades formed of two different metals and having improved structural and performance characteristics.

There are, in general, two types of hacksaw or power blades in commercial use at the present time which will be referred to herein, for convenience, as "all-hard" blades and "safety" blades. An all-hard blade is composed entirely of high speed tool steel such as tungsten steel, and this is the most satisfactory blade from a strength standpoint and for dimensional accuracy. It is, however, an expensive blade and has a tendency to shatter when broken so that its use in many situations is exceedingly dangerous. The safety blade is composed of two metals including a toothed section of high speed tool steel and a backing section of softer steel. Such a blade is less likely to shatter when broken, which is why it is referred to as a safety blade, but it is an inherently weaker blade. Commercial standards permit the manufacture and sale of safety blades which are ⅛ inch wider than comparable all-hard blades, but even then a safety blade will not withstand as much stress as an all-hard blade. In addition, safety blades, as heretofore made, are usually inaccurate or non-uniform dimensionally so that the performance of such blades is erratic and unpredictable except over wide ranges.

The aim of the present invention is to provide a new safety blade having the advantages of previous safety blades, such as resistance to shattering and ability to withstand vibration and having, at the same time and unlike previous safety blades, a strength and dimensional accuracy and uniformity comparable to that of all-hard blades.

A further aim of the invention is to provide an improved safety blade of the type referred to which is economical to fabricate, not only from the standpoint of economy of materials used, but also because the use of complex techniques, unduly close tolerances and a multiplicity of manufacturing operations are avoided.

Another aim is to provide a method of forming a composite blade enabling the selection of materials solely on the basis of operating results desired in the final product and not circumscribed because of limitations in the method of forming the blade.

Other objects will be in part obvious and in part pointed out more in detail hereinafter.

The invention accordingly consists in the features of construction, combination of elements and arrangement of parts which will be exemplified in the construction hereafter set forth and the scope of the application of which will be indicated in the appended claims.

Figure 2:
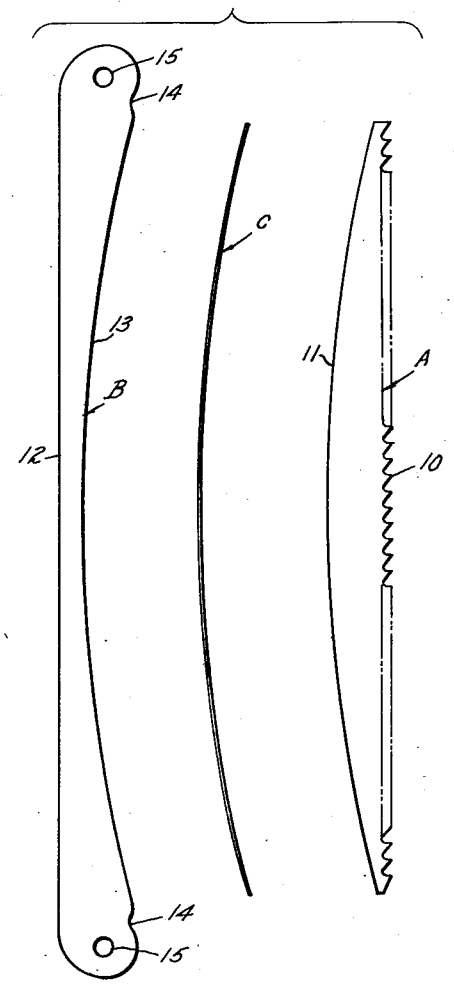

In the drawings:

Figure 1 is a side view of a completed blade made in accordance with the invention; and Figure 2 is an exploded view showing the component parts of the blade.

In forming the composite safety blade of the present invention, the toothed section A and back section B are fabricated separately and are subsequently assembled and joined to form the final blade. Taking up first the fabrication of the toothed section A, this section is preferably formed of high speed tool steel or other material having the desired physical properties required in the teeth of a metal cutting saw. In general, it is satisfactory to employ a steel of the type now generally used throughout in all-hard blades. For example, such a material should have red hardness so that it will not lose its hardness at elevated temperatures which might be created during a sawing operation, and the metal should be resistant to abrasion and should provide edge toughness. The selection of a particular material having the desired properties is, of course, within the ability of one skilled in the art.

Assuming that the toothed section A is to be made of tool steel, such steel usually is furnished in the form of wide sheets. In that case the sheets are first sheared to form strips of suitable width in the usual manner. In practising the present invention, the strips are cut to a width at least equal to the maximum width of the toothed section A. After the sheet is sheared to provide a strip of proper width, the desired teeth are then milled along one edge, as indicated at 10, and the teeth are set, all in accordance with conventional or standard manufacturing techniques. Following this operation, the strips having the teeth formed along the one straight edge 10 are then shaped, such as by shearing, to form the section into a proportioned beam of varying thickness which is of greater width at the center than at the ends. As shown in the drawings, the toothed section 10 may be in the form of a beam having an arcuate rear edge 11. The object here is to form a beam which is so proportioned that when the ends of the blade are fixed, the resistance to distortion and breakage from a force applied upwardly intermediate the ends of the blade will be as uniform as possible throughout the length of the blade. Since the maximum width of the toothed section has to be less than the total width of the blade, the optimum shape of the toothed section appears to be one having an arcuate or slightly flattened arcuate rear edge. The shape of the exemplary beam may be described as plano-convex in cross-section. However, any geometric pattern approximating the exemplary beam shape will provide a similar effect, although to a lesser degree. After the toothed section A has been completely formed as just described, the section is then subjected to a conventional heat treatment, which includes heating and quenching to provide the desired hardness. It is an advantage of the present invention that all workings of the toothed section A may take place before the heat treating or hardening step.

Concomitantly with the formation of the toothed section A there is formed the corresponding back section B. The back section B is formed of a softer metal than the toothed section A. The metal of the back section B is selected to provide a material which will dampen vibration, which will resist shattering, and which will have the desired physical properties for attachment to the saw blade holder. Generally speaking, any carbon steel may be used and, in some instances, alloys such as those containing nickel are desirable. Conventional band saw stock has been found to be particularly desirable for this section. Since the back section B is formed of a metal which is softer than high speed tool steel, even after hardening and tempering, it is, of course, possible with conventional or standard fabricating equipment to shape the back section B either before or after heat treatment. In any event, the back section may be prehardened and tempered before it is joined to the toothed section A with the result that a wide choice of materials and heat treating techniques is possible to produce a back section having exactly the proper and desired characteristics for the specific saw blade being fabricated.

As best indicated in Figure 2 of the drawings, the back section B is made somewhat longer than the toothed section A and is provided with a straight rear edge 12 and a shaped edge 13 which is complementary to the rear edge 11 of the toothed section A. Also, as indicated, the back section B is notched at both ends as indicated at 14 for the purpose to be discussed hereinafter. It will be noted that the extremities of the back section B contain the pin holes 15 by means of which the saw blade is fastened into the holder or saw in which it is used.

After the toothed section A and back section B are formed as previously described, the sections are joined together by arc welding or other bonding technique to form the composite blade shown in Figure 1. In order to form a proper bond between the edges 11 and 13 and to avoid the necessity for precise grinding to form mating surfaces, it is preferred to use a bonding layer such as the metal strip C indicated in Figure 2. The metal strip C is preferably formed of a metal having good alloying or cohering properties. By way of example, the strip C may be formed of stainless steel or, if a lower melting point is desired, one of the conventional brazing metals. The sections A and B during bonding are placed in a fixture which is designed to keep the heat localized at the joint and thus prevent annealing of the blade sections. The welding is preferably accomplished with a non-consumable type electrode so as to apply heat only and to cause fusion of the strip C with the edges 11 and 13. As a result of this treatment, when properly carried out using standard welding equipment, the bonding layer C and edges 11 and 13 are caused to coalesce and unite without adversely affecting the temper of the toothed section to form an eutectic bond, the bond being characterized by a thorough alloying and union of the adjacent surfaces.

After the blade sections have been joined together as thus described, the blade may be finished in any desired manner to form the final product. In general, it is preferred to subject the sides of the blade to a grinding operation to remove the evidence of the weld or other bond so that the final blade appears to the casual observer to be formed of a single metal.

Since the blade sections A and B may be completely formed and hardened prior to bonding, there is no distortion of the blade caused by the differences in coefficient of expansion of the two metals, and there are substantially no internal stresses in the two blade sections. Accordingly, the dimensional accuray of the blade is maintained throughout and the blades are uniformly of high quality. Also, it has been found that the blades of my invention are more rigid and resist bending. This is believed to be because the shape of the sections is such that the blade will effectively counteract the bending action on the blade normally created by the pressure of the work on the toothed section.

As a result of the use in a composite blade of a designed beam of high hardness material, it is possible to provide in a safety blade a strength which is comparable to that of an all-hard blade. As will be observed, the proportion of hard metal to softer backing metal is varied from end to end in accordance with the stress which will be applied to the blade in normal use. Thus the width of the toothed section is a maximum at the zone of maximum stress intermediate the two pin holes 15, while the end portions which are of smaller width are subjected to less stress, permitting the use of a greater proportion of backing metal in these zones.

It also has been found that by forming the hard steel section in the form of a designed beam, there is inherently a greater strength in the joint due to the greater length of the joint. Not only are the stresses during use of the blade applied over a greater area, but in addition, the stresses are applied to the joint in a different direction. As a result, it is possible to form a joint which actually is stronger than the remainder of the blade. Accordingly, when breakage of the blade occurs, it rarely occurs at the joint.

As previously mentioned, the back section B is formed with the end notches 14 with the result that, when pressure is applied to the blade by means of pins inserted through the pin holes 15, the stress lines will be deflected along the adjacent edge of the notch 14 and thus will enter the toothed section A at a point which is spaced from the end of the toothed section A which, of course, is the weakest point of the joint.

Because of the shape of the sections A and B, it is possible to put the pin holes 15 in the back section B. This is important because, unlike the toothed section A, the back section B may be formed of material specifically selected and hardened to the precise degree to meet the requirements of a pin hole section. As will be apparent, considerable force is applied to the blade during use by means of pins inserted through the holes 15 and, if this force is not distributed by distortion of the pin holes 15 to correspond to the shape of the pin, breakage will easily occur. This factor is so important that it is the practice in the manufacture of all-hard blades to anneal the pin hole area, which, of course, is very difficult to control and is rendered unnecessary by following the practice of the present invention.

It thus will be seen that there has been provided in accordance with the present invention a composite safety blade having a strength comparable to that of all-hard blades and dimensional accuracy and uniformity combined with the advantages of a safety blade, such as resistance to shattering and vibration.

As many changes could be made in the above construction and many apparently widely different embodiments of this invention could be made without departing from the scope thereof, it is intended that all matter contained in the above description or shown in the accompanying drawings shall be interpreted as illustrative and not in a limiting sense.

It is also to be understood that the language used in the following claims is intended to cover all of the generic and specific features of the invention herein described and all statements of the scope of the invention which, as a matter of language, might be said to fall therebetween.

I claim:

1. A composite blade comprising a cutting section formed of a strip of high hardness steel having a toothed straight edge and formed as a beam of varying width diminishing toward the ends thereof, and a backing section formed of a strip of softer metal joined to the cutting section, said backing section having a shape complementary to the cutting section at the joint.

2. A composite blade as defined in claim 1 wherein the cutting section and backing section are joined by a bond of filler metal therebetween.

3. A composite blade comprising a cutting section formed of high hardness steel having a front toothed straight edge and a rear edge shaped to produce a section of minimum width at the end portions and of maximum width at the center portion of the section, and a backing section of softer metal having a mating edge complementary and bonded to the rear edge of the cutting section.

4. A composite blade of uniform thickness and width comprising a cutting section of high hardness steel and a backing section of softer metal, a major proportion of the width of the end portions of the blade being composed of said softer metal and a major proportion of the width of the center portion of the blade being composed of said high hardness steel.

5. A composite blade comprising a cutting section formed of high hardness steel having a toothed straight edge and a generally arcuate rear edge, and a backing section of softer metal having an edge complementary to said rear edge and joined thereto.

6. A composite blade comprising a cutting section formed of high hardness steel having a toothed straight edge and of varying width diminishing toward the ends thereof, and a backing of greater width at the ends and having a shape complementary to the shape of the cutting section, the backing section being apertured to permit mounting of the blade in a tool.

7. A composite blade comprising a cutting section of high hardness steel having a toothed straight edge and diminishing in width toward the ends thereof, and a backing section of softer metal having an inner edge complementary and joined to the rear edge of the cutting section, said backing section being of greater length than the cutting edge so as to extend beyond the ends thereof.

References Cited in the file of this patent

UNITED STATES PATENTS

| | | |
|---|---|---|
| 885,770 | Lucas | Apr. 28, 1908 |
| 907,167 | Neill | Dec. 22, 1908 |
| 1,181,529 | Hutton | May 2, 1916 |
| 1,321,391 | Pittman | Nov. 11, 1919 |
| 2,214,827 | Boe et al. | Sept. 17, 1940 |
| 2,431,517 | Stevens | Nov. 25, 1947 |
| 2,683,923 | Replogle | July 20, 1954 |